United States Patent [19]

Beaulieu

[11] E Re. 31,565

[45] Reissued Apr. 24, 1984

[54] PORTABLE SHELTER

[75] Inventor: Bryan J. Beaulieu, Burnsville, Minn.

[73] Assignee: Rupp Industries, Inc., Burnsville, Minn.

[21] Appl. No.: 267,430

[22] Filed: May 26, 1981

Related U.S. Patent Documents

Reissue of:

[64] Patent No.: 4,156,433
Issued: May 29, 1979
Appl. No.: 899,232
Filed: Apr. 24, 1978

U.S. Applications:

[63] Continuation-in-part of Ser. No. 807,144, Jun. 16, 1977, abandoned.

[51] Int. Cl.[3] ..... A45F 1/16; E04B 1/32; E04B 1/347

[52] U.S. Cl. ..... 135/102; 52/109; 52/646; 211/202; 248/421; 248/277; 135/105; 135/110

[58] Field of Search ..... 135/4 R, DIG. 1, DIG. 3; 52/109, 81, 82, 86, 645, 646, 222, 63; 211/195, 198, 202; 40/605, 606, 610, 611; 160/135; 248/421, 277; D6/85

[56] References Cited

U.S. PATENT DOCUMENTS

| | | | |
|---|---|---|---|
| 624,152 | 5/1899 | Baggett | 135/5.2 |
| 931,529 | 8/1909 | Vaghi | 135/DIG. 3 |
| 1,712,836 | 5/1929 | Mils | 52/109 |
| 3,092,932 | 6/1963 | Wilson | 52/109 |
| 3,152,347 | 10/1964 | Williams | 52/109 X |
| 3,375,624 | 4/1968 | Mikulin | 52/109 |
| 3,448,748 | 6/1969 | Walrave | 135/1 R |
| 3,469,587 | 9/1969 | Folkes | 135/1 R |
| 3,496,687 | 2/1970 | Greenberg et al. | 52/109 |
| 3,559,353 | 2/1971 | Partridge | 52/63 |
| 3,690,078 | 9/1972 | Maynard | 135/1 R X |
| 3,714,749 | 2/1973 | Aitken | 52/70 |
| 3,780,477 | 12/1973 | Sprung | 52/222 X |
| 3,807,104 | 4/1974 | Webster | 135/4 R X |
| 3,863,659 | 2/1975 | Gillis | 135/4 R |
| 3,975,872 | 8/1976 | Pinero | 52/109 X |

FOREIGN PATENT DOCUMENTS

| | | | |
|---|---|---|---|
| 306912 | 7/1914 | Fed. Rep. of Germany | 135/DIG. 3 |
| 565831 | 6/1930 | Fed. Rep. of Germany | 135/4 R |
| 2425857 | 12/1975 | Fed. Rep. of Germany | 135/4 R |
| 1126633 | 11/1956 | France | 52/109 |
| 626040 | 10/1961 | Italy | 135/4 R |
| 307241 | 8/1955 | Switzerland | 52/109 |
| 7755 | of 1915 | United Kingdom | 135/DIG. 3 |
| 399286 | 10/1933 | United Kingdom | 52/109 |

*Primary Examiner*—J. Karl Bell
*Attorney, Agent, or Firm*—Orrin M. Haugen; Thomas J. Nikolai

[57] ABSTRACT

A collapsible shelter structure having a pair of collapsible frame members disposed at opposed ends thereof for supporting panel means which extend therebetween, wherein the collapsible frame means include a braced lazy-tong structure which is designed to maintain the frames in erect disposition, and wherein bracing strut means are pivotally coupled to alternate outer apices of the lazy-tong structure for rendering the frame means both stable and rigid. To further enhance rigidity of the erect structure, the inner apices are normally formed as a straight angle when the shelter structure is in erect form, with these inner apices forming a series of spaced points along a semicircle of fixed radius. The collapsible shelter means may be taken down and stored in collapsed form when desired, with generally rigid or durable base side panels being provided to protect the structure from inadvertent damage during use and during storage. Means may be provided for normally urging the bracing struts into engagement so as to provide a more stable and rigid structure, and furthermore means are provided for selectively disengaging the bracing strut means to enable the user to take the structure down into collapsed form.

16 Claims, 27 Drawing Figures

PORTABLE SHELTER

Matter enclosed in heavy brackets [ ] appears in the original patent but forms no part of this reissue specification; matter printed in italics indicates the additions made by reissue.

CROSS-REFERENCE TO RELATED APPLICATION

The present application is a continuation-in-part of my co-pending application Ser. No. 807,144, filed June 16, 1977, now abandoned and assigned to the same assignee as the present application.

BACKGROUND OF THE INVENTION

The present invention relates generally to a collapsible shelter means utilizing a pair of panel supporting collapsible frame means arranged at opposed ends of the shelter. Specifically, the structure of the present invention provides improved and durable collapsible end frames, wherein the frames are easily and readily erected, and while erected, are maintained in stable disposition. Specifically, bracing strut means are provided between alternate outer apices of the lazy-tong structure so as to add rigidity to the structure when erect, and further to facilitate ease of collapsing, whenever desired.

In the past, collapsible shelter means have been proposed and described utilizing pairs of collapsible frame means at the opposed ends thereof. In certain instances, lazy-tong structures have been proposed and utilized for this purpose. Generally speaking, however, the lazy-tong structure, while providing ease of erection, has only been of limited utility. Two major problems have been encountered, the first being that of ease of erection, with each of erection being limited to those collapsible shelters of relatively small size. The other problem deals with lack of stability in the presence of wind loads or other forces. In the presence of unusual external loading, the conventional lazy-tong structures become unstable and sometimes tend to assume anomalous configurations, and furthermore may inadvertently collapse. The structure of the present invention is provided with means to assist erection, and by the same token to resist inadvertent collapse, and furthermore to provide a stable and durable construction when in erect form to resist external loading.

Specifically, the collapsible shelter means of the present invention utilizes improved collapsible frame means disposed at opposed ends thereof, with such opposed frame means being mirror images of each other. In this connection, strut means or bracing means are provided at and between adjacent spaced apart outer apices of the lazy-tong structure, with the strut means thereby providing a means of rendering the overall frame means both rigid and durable. Furthermore, the inner apices are designed so as to permit pairs of mutually adjacent links to be coupled together to form a straight linear angle of substantially 180°, thereby further enhancing the rigidity of the overall structure. When erect, therefore, the frame means provides a durable truss arrangement which provides both durability and stability to the overall shelter. With the arrangement of the straight angle for the inner apices, these apices form a pattern which substantially circumscribes a circle, generally a semicircle, of fixed radius. The inner apices are defined as those points at which mutually adjacent links meet and are joined together. As a further feature, means are provided for coupling or linking the bracing strut means together for either simultaneous or serial disengagement of these strut means, thereby facilitating collapse of the structure whenever desired. In certain instances, it is desirable to couple together the disengagement means, thereby permitting a single operator to simultaneously disengage the strut means from both collapsible frame means at the opposed ends of the collapsible structure.

As a feature of facilitating ease of folding of the panels supported by the opposed frames, each of the panels is coupled to the frames at the cross points of the lazy-tong structure, and the inner apices, upon folding, are arranged to provide a taut segment in the folded member. This arrangement facilitates storage without adversely affecting the fabric, and contributes to the compact folding of the overall structure.

SUMMARY OF THE INVENTION

Therefore, it is a primary object of the present invention to provide an improved collapsible shelter means which utilizes a pair of improved stable and durable frame means at opposed ends thereof, the system being designed to maintain the erect disposition, and further being designed to provide ease of either erecting or collapsing the structure whenever desired.

It is a further object of the present invention to provide an improved collapsible shelter means which utilizes a lazy-tong structure for the collapsible frame means, and additionally which utilizes a bracing strut between outer apices of the lazy-tong structure, wherein the bracing strut means may be simultaneously disengaged or removed from erect disposition whenever desired in order to facilitate collapse of the shelter.

It is yet a further object of the present invention to provide an improved collapsible shelter means utilizing a lazy-tong frame structure at opposed ends thereof, and wherein the lazy-tong structure is provided with mechanical biasing means to assist in initially erecting and thereafter to maintain the frame means in erect disposition.

It is yet a further object of the present invention to provide end frames for collapsible structures in the form of repeated links wherein the inner apices of the linkage system when erect form straight angles of substantially 180° between adjacent links, and wherein bracing strut means are provided between adjacent outer apices of the linkage system so as to improve and maintain stability of the structure when erect.

It is yet a further object of the present invention to provide an improved collapsible shelter means which is provided with a series of shelter panels, and wherein the panels are coupled to the inner portions of the lazy-tong structure, thereby facilitating ease of storage and ease of folding upon collapse of the structure for storage purposes.

Other and further objects of the present invention will become apparent to those skilled in the art upon a study of the following specification, appended claims, and accompanying drawings.

BRIEF DESCRIPTION OF THE DRAWINGS

FIGS. 17, 18 and 19 are fragmentary end views of the frame means and panels, with FIG. 17 illustrating one complete panel in taut erect configuration, with FIG. 18 illustrating the panel in partially collapsed form, with one adjacent inner apex being illustrated; and wherein FIG. 19 illustrates a series of such panels in collapsed form;

DESCRIPTION OF ONE ALTERNATE PREFERRED EMBODIMENT

Figure 1:
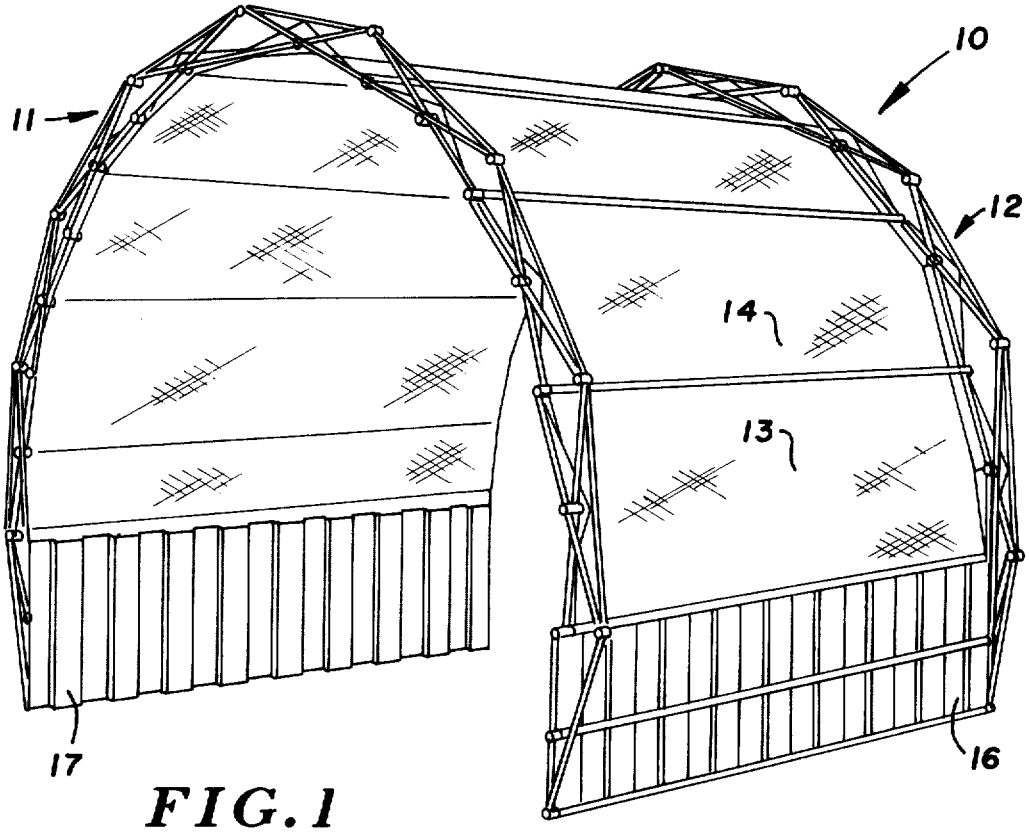
FIG. 1 is a perspective view of one embodiment of the invention showing a fully erected collapsible shelter means having collapsible frame means at opposed ends thereof prepared in accordance with the present invention.

In accordance with one alternate preferred embodiment of the present invention, and with particular attention being directed to FIG. 1 of the drawings, the collapsible shelter means generally designated 10 includes a pair of collapsible frame means generally designated 11 and 12 disposed at opposed ends of the structure, and with the frame means supporting a plurality of panels extending between the frame means, such as the panels 13 and 14. As is apparent in the drawings, collapsible frame means 11 and 12, each in the form of a lazy-tong structure with interconnected link elements, form the actual structural arrangement for the end frames, with the collapsible frame means 11 and 12 being mirror images, one to the other.

Figure 2:
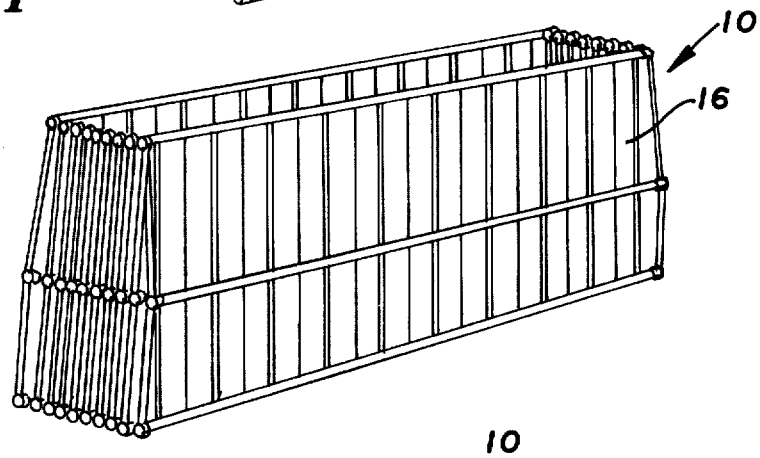
FIG. 2 is a view similar to FIG. 1, but showing the shelter means in collapsed disposition.
Figure 3:
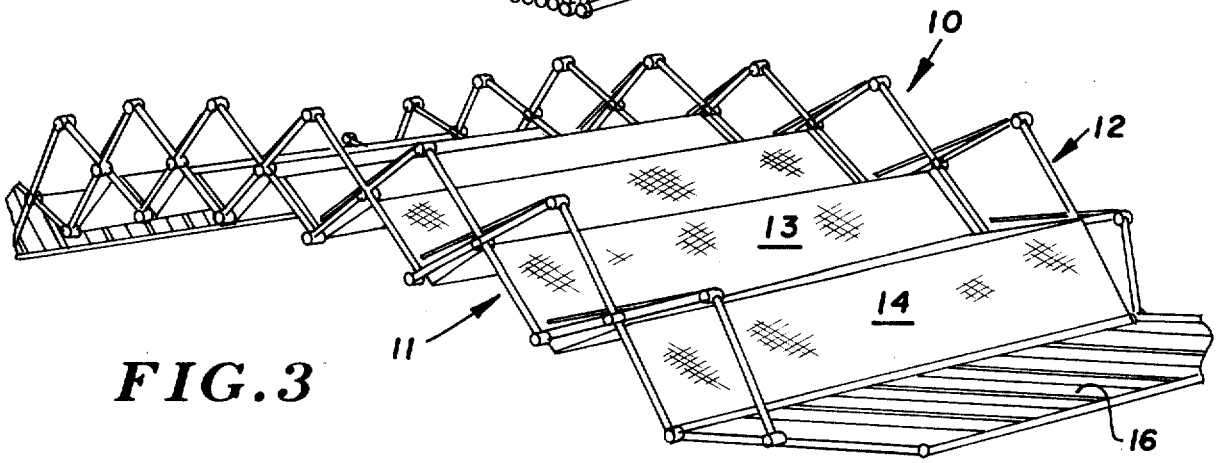
FIG. 3 is a perspective view of the shelter means illustrated in FIG. 1, and showing the arrangement in partially erected form.

While the view of FIG. 1 illustrates the structure in erect form, FIGS. 2 and 3 show the structure in collapsed and semi-erected form respectively. As is apparent in FIG. 2, the collapsible shelter means 10 is shown in collapsed form proper for storage, and with the rigid end panels 16 and 17 being employed to provide some degree of protection for the flexible panels, such as panels 13 and 14 during storage. Also, panels 16 and 17, being rigid and durable, provide a means of protecting the structure from damage due to kicking, striking with hard objects, or other typical hazards for this type of structure.

Figure 16:
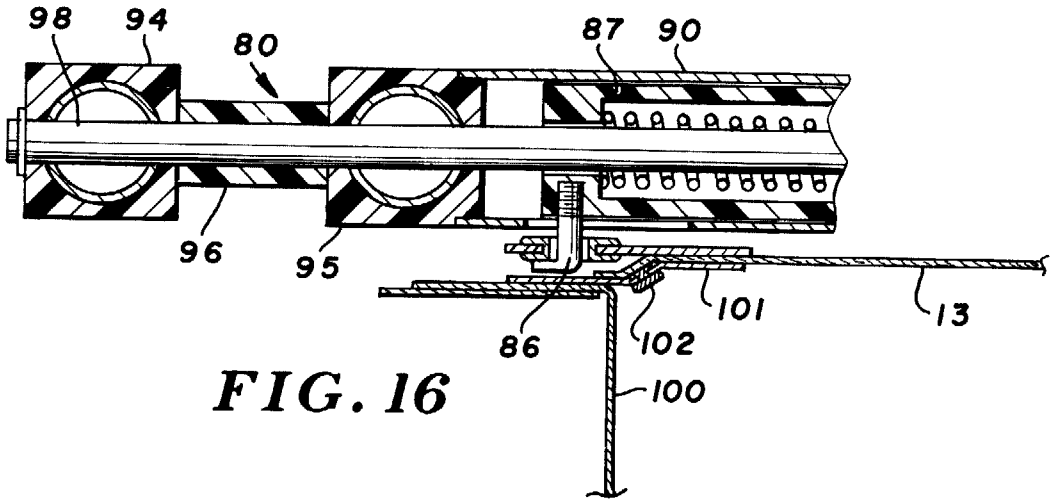
FIG. 16 is a detail fragmentary sectional view of one end of the structure as illustrated in FIG. 14, but showing an end panel secured thereto, and with portions of the structure being shown broken away.

As can be appreciated, the structure of the present invention may provide a portable collapsible shelter of any desired length. The practical limitation on shelter length would typically be the weight of the overall structure, and also limitations due to wind loading and the like which could become substantial when highly elongated structures are utilized. As a practical matter, therefore, when elongated structures are desired, a number of individual shelter units may be placed end-to-end until the desired length is achieved. As illustrated in FIG. 16 herein, end panels may be utilized as additional protection from the elements. Typically, such end panels may be attached by means of zippers, buttons, snaps, swivels, or other such conventional fasteners. In the embodiment illustrated in FIG. 16, the arrangement becomes water-tight and resists collection or build-up of accumulations of water, snow, ice or the like.

As a typical material of construction, the collapsible frame means may be fabricated from lightweight durable aluminum tubing, although fiberglass rods may be employed, with panels 13 and 14 preferably being fabricated from a durable material such as nylon, polyethylene terephthalate (Dacron), or the like. The panels 16 and 17 may typically be fabricated from fiberglass or the like, with all such materials being, of course, readily commercially available. When fiberglass is utilized as a material of construction for panels, such as panels 16 and 17, these panels are preferably corrugated so as to provide added rigidity to the overall structure. Either vertical or horizontal corrugations may be employed, with vertical corrugations being generally preferred.

Figure 4:
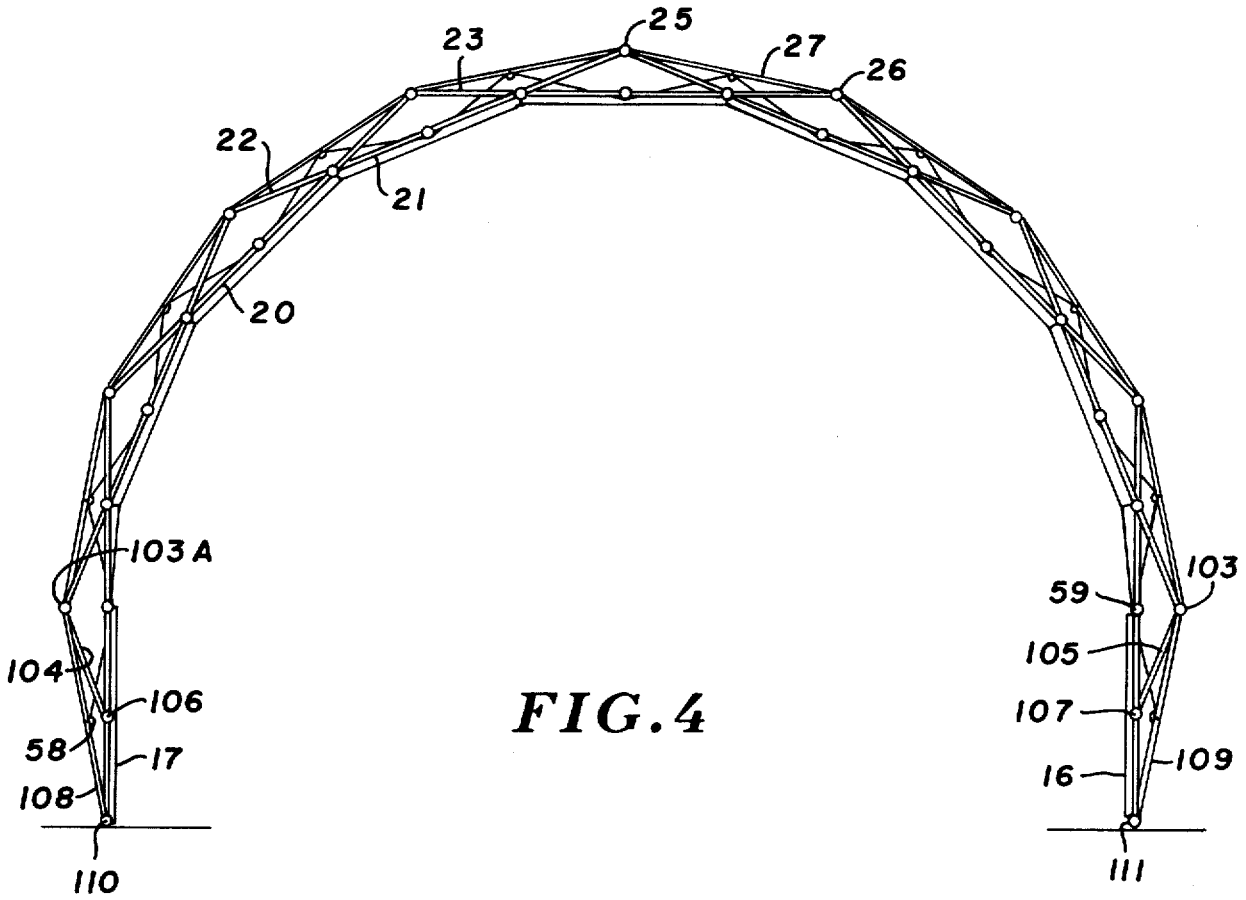
FIG. 4 is an end view of the shelter means of the embodiment of FIG. 1, and illustrating the details of one of the collapsible frame means.

Attention is now directed to FIGS. 4–7 inclusive, wherein the frame means is illustrated in essentially erected disposition. As illustrated, the collapsible frame means includes a lazy-tong structure having first and second interconnected strut assemblies which, in erect disposition, form alternate inwardly and outwardly disposed structural spans. Specifically, at FIG. 4, the inwardly disposed spans are shown at 20 and 21, while the outwardly disposed spans are illustrated at 22 and 23. Also, as is apparent in FIG. 4, the outwardly disposed spans have spaced apart apices such as at 25 and 26, with these spaced apart apices being bridged by a brace or strut as at 27. As is apparent from the illustration in FIG. 7, the individual struts such as struts 27 and 28, for example, are pivotally coupled to the hub formed at apices 25 and 26 respectively, thus permitting the brace or strut to be drawn inwardly against a bias force, more fully explained hereinafter, to facilitate ease of take-down of the assembly. In the erect position as is illustrated in FIG. 4, however, the individual braces or struts which span the outer spaced apart apices lends a significant degree of stability and rigidity to the structure when erected.

Figure 5:
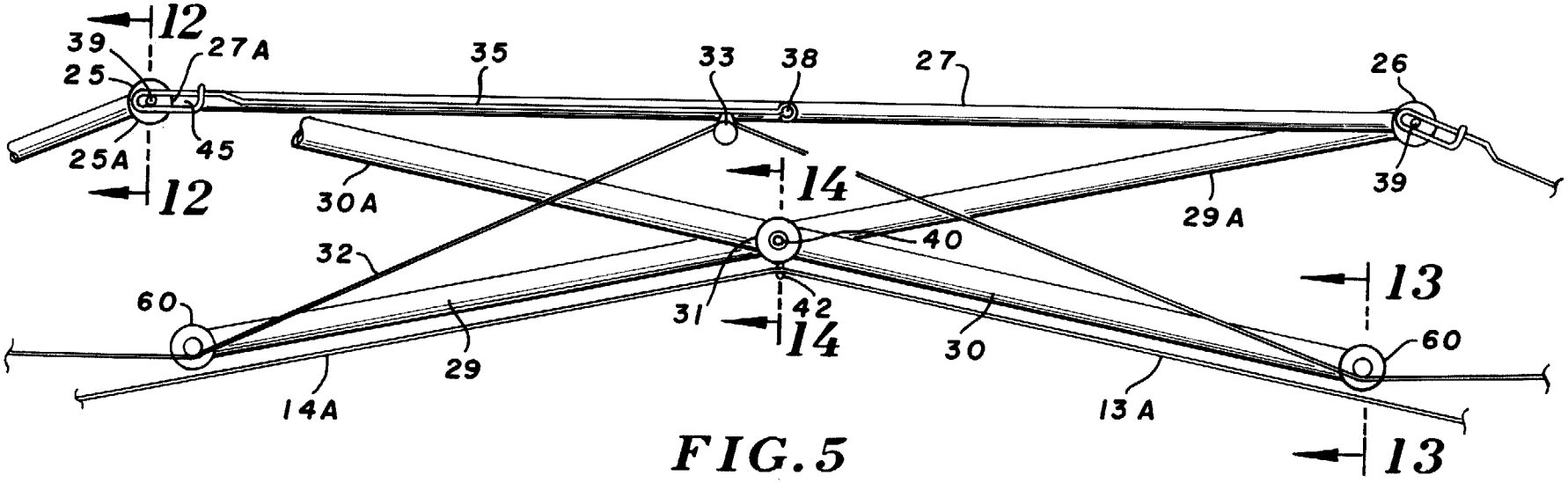
FIG. 5 is a detail elevational view of one repeating segment of the frame means of the embodiment of FIG. 1, and illustrating the structure in erect disposition; with FIG. 5 being shown on a slightly enlarged scale.
Figure 6:
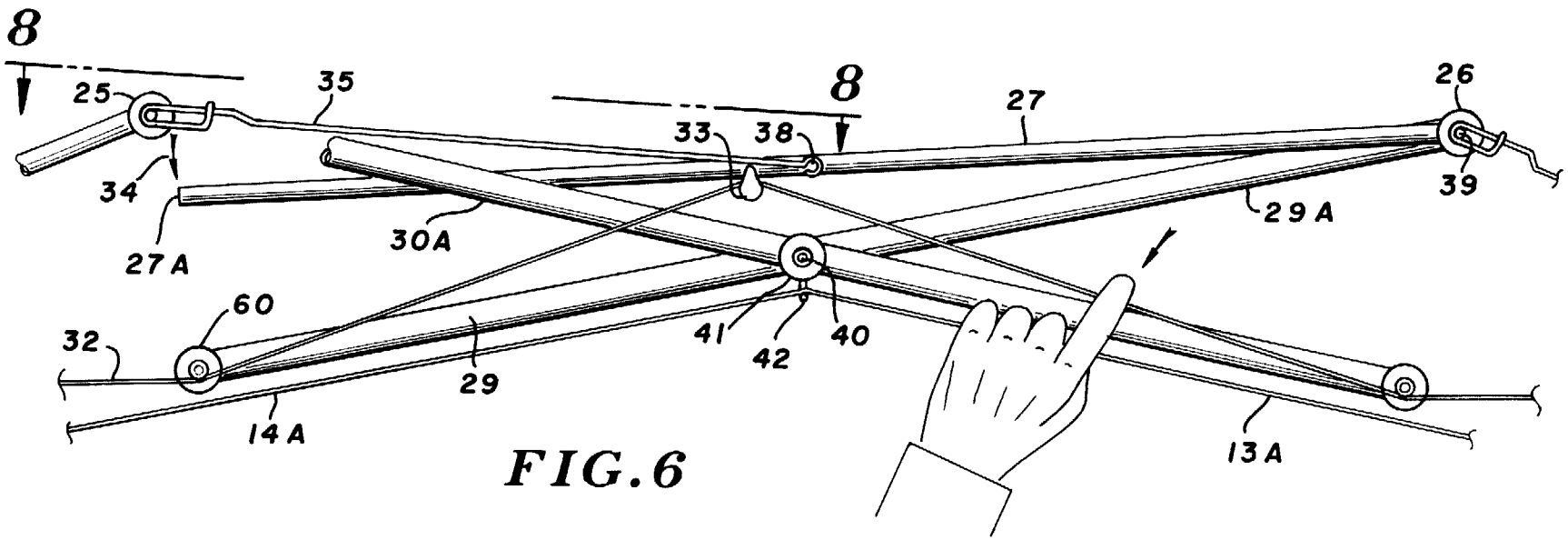
FIG. 6 is a view similar to FIG. 5, and showing the frame means in the form upon initiation of collapse thereof.

With attention now being specifically directed to FIGS. 5 and 6, it will be seen that the linkage assemblies forming the inwardly disposed structural spans are illustrated as at 29 and 30. The linkage assemblies 29 and 30 are pivotally joined in typical lazy-tong fashion through hub or sleeve 31, and each extend outwardly in an outwardly extending link portion 29A and 30A respectively to the outwardly disposed apices 25 and 26. The tip portion of 30A is broken away so as to more fully show the details of the cradle member 35 described more fully hereinafter.

Figure 10:
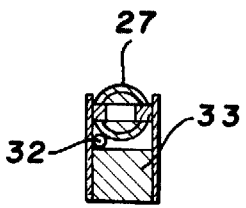
FIG. 10 is a detail sectional view taken along the line and in the direction of the arrows 10—10 of FIG. 9.
Figure 9:
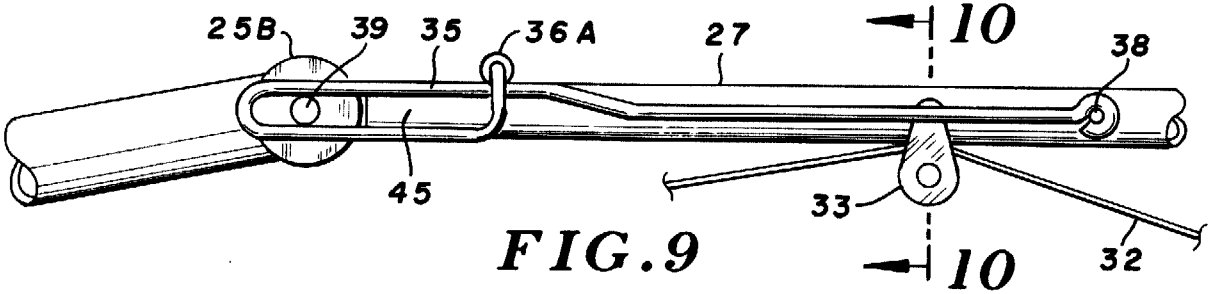
FIG. 9 is a view similar to FIG. 8, but taken in a front elevational plane, and further illustrating the details of the strut guide arrangement.
Figure 11:
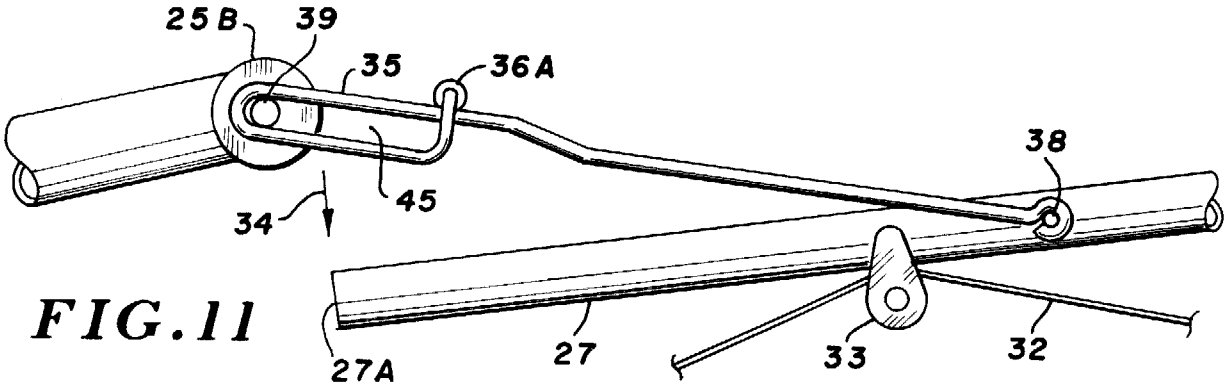
FIG. 11 is a view similar to FIG. 9, and illustrating the disposition of the outer strut upon initiation of collapse of the erect structure.

As is apparent in the view of FIG. 6, a continuous lanyard element 32 extends throughout the entire extent of the collapsible frame means, and is coupled to the outer struts such as strut 27, through pulley 33 (the specific operation and detail of the lanyard is more fully disclosed in FIGS. 9, 10 and 11). Pulley 33, in turn, is utilized to exert an inward force on strut 27 in the direction of arrow 34 when a pull is exerted on the lanyard device. Such a pull applies a tripping force to the system, as previously indicated.

Figure 8:
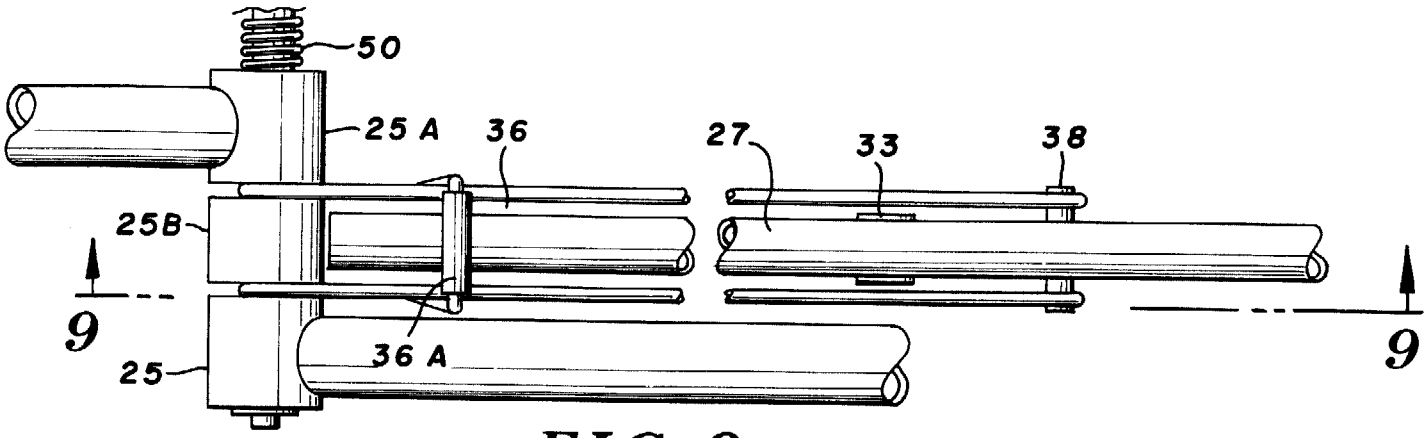
FIG. 8 is a fragmentary top elevational view of one repeating unit of the frame means, and illustrating the structure on a still further enlarged scale from FIG. 5, with FIG. 8 being taken along the line and in the direction of the arrows 8—8 of FIG. 6.

A cradle structure is illustrated as at 35, with cradle 35 having a strut receiving channel formed therewithin, particularly as is illustrated in FIG. 8. The strut receiving channel is shown as at 36 with a cross-stop shown at 36A, and with strut 27 being shown disposed therewithin. With continuing attention being directed to FIGS. 5 and 6, however, it will be seen that cradle 35 is pivotally secured to strut 27 as at 38, thus permitting arcuate motion of strut 27 in the direction of arrow 34. As previously indicated, the base end of strut 27 is pivotally mounted within the hub formed at apex 26, and specifically about pin 39.

It will further be appreciated, of course, that individual linkage members 29 and 30 are pivotally secured together by pin 40 which, in turn, is disposed within hub 41. Hub 41 serves an alternate purpose of a base member for the retention of the panels, such as fabric panels 13A and 14A. The draping and support of the fabric will be more fully described hereinafter, it being sufficient to note at this point that tie points such as at 42 having hooks therein are utilized for this purpose.

With continued attention being directed to FIGS. 5 and 6, it will be noted that cradle 35 is provided with a pin receiving slot such as at 45. Pin receiving slot 45 permits relative motion to occur between the individual struts and the basic lazy-tong structure during erection and collapsing thereof, with this pin receiving zone being required since the effective distance or real distance between the individual apices shifts and varies during erection and collapsing of the structure. This slot permits relative motion to occur so as to assist in ready disassembly of the arrangement, but while maintaining rigidity while the arrangement is erected.

While the collapsible shelter of FIGS. 1–19 is in erected disposition, the strut such as bracing strut 27 actually form a compression brace between the individual apices. In erected disposition, and in the absence of any unusual load, the bracing strut 27 may be spaced apart from the abutment surface of the adjacent hub by a distance of approximately 0.010 inch. In the presence of an outward-going force applied to the structure, the free tip end of bracing strut 27, as at 27A, engages and strikes the surface of the hub 25A formed at apex 25. In the structure illustrated, loads greater than the normal load due to the inherent weight of the assembly causes the tip portion 27A of bracing strut 27 to engage the surface of hub 25A. It will be appreciated that those situations wherein the load applied to the structure is less than the normal load due to the inherent weight of the assembly will cause the tip portions of the bracing strut to move away from the surface of hub 25A.

Figure 12:
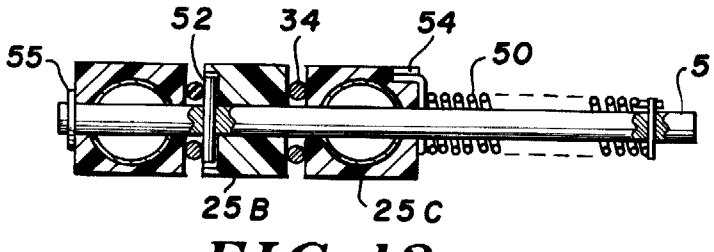
FIG. 12 is a sectional view taken along the line and in the direction of the arrows 12—12 of FIG. 5.

Attention is now directed to FIGS. 8, 9, 10 and 11 wherein further details of the individual articulating joints are shown, along with the details of the operation of the lanyard device. Specifically, in order to provide a constant bias force on strut 27 and its identical and corresponding strut devices, torsion spring 50 is utilized. Torsion spring 50 is anchored on hub 25A, for example, and is secured upon a pin or through-shaft 51 (FIG. 12), pin 51 having a transverse pin 52 extending therethrough and being locked within a groove formed in hub member 25B. The torsional rotational force applied to pin 52 by spring 50 may be controlled by preloading, with the clevis portion of spring 50 being, in turn, engaged in bore 54 formed in hub member 25C. In order to prevent spring 50 from assuming a solid configuration and thereby binding upon the pin, it is normally preferred that spring 50 be maintained in tension. The retaining ring is shown at 55 to retain pin 51 suitably in place. The lengths of wire forming slotted cradle 35 are shown in FIG. 12. For purposes of ease of handling, it is normally deemed desirable to place a cup or sleeve over each of the springs in order to shield them.

With continued attention being directed to FIGS. 9 and 10, it will be noted that lanyard cord 32 passes through pulley 33, as illustrated in FIG. 10 specifically, and a downward or inwardly directed force applied to lanyard 32 will, in turn, be imparted to strut 27. Accordingly, inward pull of the lanyard will disengage each of the individual struts which extend between the outwardly disposed apices. Since the structure of each is identical, one to the other, it is not felt necessary to describe this operation in detail, other than to state that the free ends of the lanyard 32 are anchored to the structure as at 58 and 59. Accordingly, any force applied inwardly of lanyard 32 will tend to disengage each of the individual strut members 27, as indicated in FIG.

7. As an alternate to securing the free ends of lanyard 32 to the walls of the structure, the lanyard 32 along with its companion lanyard at the opposed end may be tied together, thus permitting a force to be applied to opposed lanyards by a single pull.

As has been indicated, since each of the identifiable repeating structural units is identical, one to another, it is believed sufficient to describe the details of the mechanism in connection with one such span only, thus avoiding repetitious disclosure. Also, it will be appreciated that each of the frame members at the opposed ends of the structure is identical, one to the other, with the exception being that each such structures represent mirror images of each other.

Figure 13:
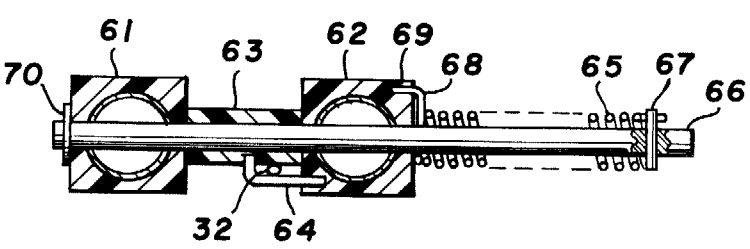
FIG. 13 is a sectional view taken along the line and in the direction of the arrows 13—13 of FIG. 5.

Attention is now directed to FIGS. 12–19 inclusive wherein further details of the structure are illustrated. FIG. 12, as previously indicated, illustrates the details of the spring loaded mechanism applying a bias or pretensioning of the individual struts or braces which extend between neighboring spaced apart outwardly disposed apices. FIG. 13, for example, illustrates the detail of construction of a typical inwardly disposed hub, such as hub 60. Hub 60 includes two individual hub elements 61 and 62 spaced apart by a sleeve member 63. A lanyard guiding pin is disposed as at 64, with lanyard 32 being disposed inwardly thereof, as illustrated. Torsion spring 65 is illustrated as being mounted upon pin 66, and being retained thereon by transverse pin 67 and clevis 68. Clevis 68, as indicated, is received in bore 69 formed within hub component 62. A second pin 70 extends through the diameter of pin 66 in order to maintain the assembly unitary.

The extent of preloading on spring 65 is discretionary, and will be controlled so as to assist in erection of the device, and resist rapid or uncontrolled collapse. The amount of the force to be applied from individual springs such as spring 65 may be determined upon the evaluation of the weight of the entire collapsible shelter structure.

Figure 15:
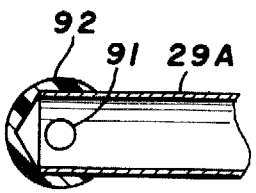
FIG. 15 is a fragmentary sectional view of a typical tube-end construction, with FIG. 15 being taken along the line and in the direction of the arrows 15—15 of FIG. 14.
Figure 14:
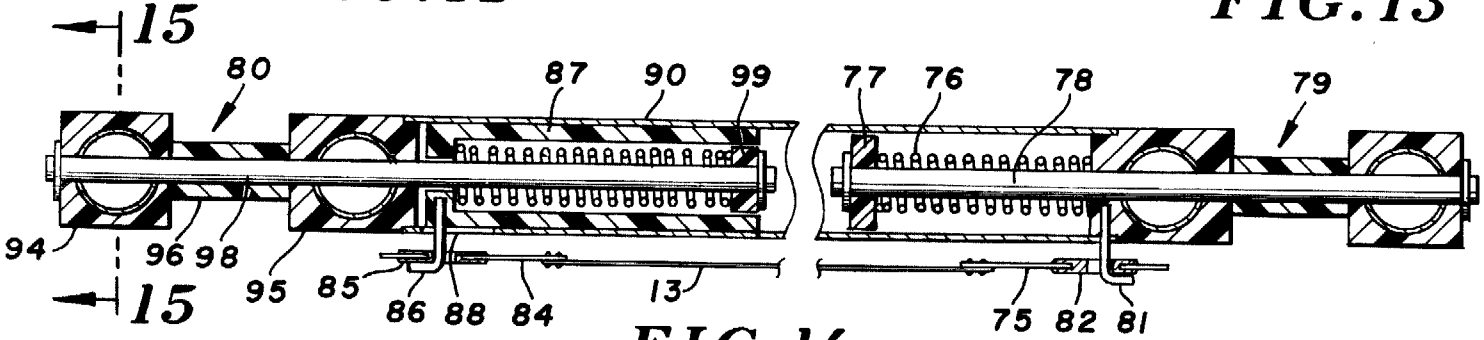
FIG. 14 is a sectional view taken along the line and in the direction of the arrows 14—14 of FIG. 5.

Attention is now directed to FIGS. 14, 15 and 16 wherein details of the panel tensioning arrangement are illustrated. Specifically, panels such as the panels 13 and 14 are supported, as indicated in FIG. 14 with regard to panel 13 by a spring biased arrangement. A reinforcing strip may be applied to the ends thereof as at 75, and tension is, in turn, obtained by a sliding spring-retaining member. A single purpose spring is provided at one end of the structure, as illustrated at 76, with this spring being retained in place by disc 77. Spring 76 is, in turn, coiled upon rod 78, with rod 78 being, in turn, retained within a hub member such as hub generally designated 79. Hub 79 is, of course, retained at the opposed end of the structure, such as at frame 12 in FIG. 1. The details of hub 79 are, of course, identical to the details of opposed hub member generally designated 80. A support hook is provided as at 81 for one end of panel 13, with grommet element 82 being utilized to distribute the forces on panel 13. At the opposed end, therefore, a reinforcing strip is provided as at 84, the reinforcing strip in turn retaining grommet 85. A second support hook is shown as at 86, with this support hook being provided for motion with double-acting fabric tensioning sleeve 87. Hook 86 is, as indicated, received within a bore formed in sleeve 87, and is permitted to slide within slot 88 formed within the tubular support member such as support member 90. Support member 90 is one of many such support members which extend between each of the inwardly disposed apices, as illustrated.

FIG. 15 illustrates the details of the tube end construction. The tube ends are provided with diametric bores as at 91 in FIG. 15, with the tube typically being that tube or link portion 29A or 30A as illustrated in FIG. 5. Those individual tubular elements, specifically linkage assemblies 29 and 30 which extend across the individual tie points formed by hooks 81 and 86, for example, do not terminate at that point. Specifically, the tubing section such as section 29A will terminate in a plastic bushing or hub as at 92, in order to avoid the exposure of an open tube.

As is more clearly indicated in FIG. 16, hub 80 includes two hub segments 94 and 95 spaced apart by sleeve member 96, and being, in turn, mounted upon rod 98 which extends through and terminates in retaining disc 99 (FIG. 14). Preferably, retaining disc 99 is arranged to slide within the interior of sleeve 87, although disc 99 may, alternatively, be arranged to be received within the confines of the tubular structure. The function of this arrangement has been previously disclosed.

Also illustrated in FIG. 16 is the end panel 100, which, as indicated, extends downwardly from the tie point formed by hook 86. The reinforcement strip, in the view illustrated in FIG. 16, such as reinforcing strip 84, has been modified in the form of reinforcing strip 101 so as to receive zipper element 102. Zipper element 102 secures end panel 100 to reinforcing strip 101, as indicated.

Figure 17:
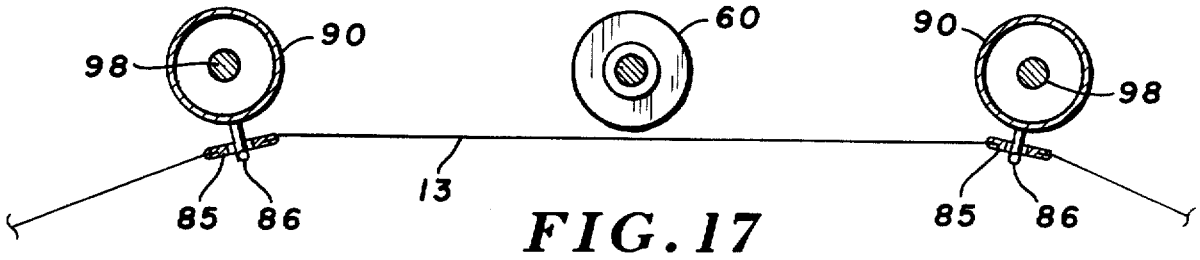
Figure 18:
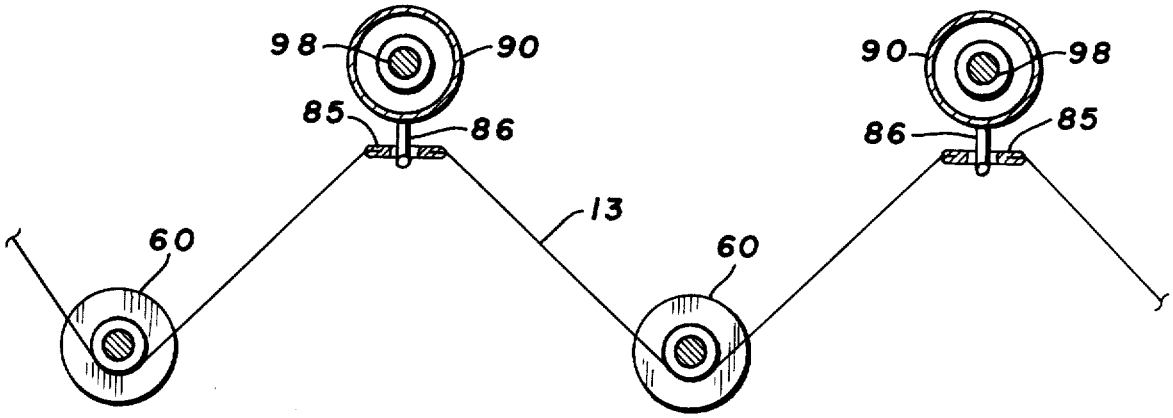
Figure 19:
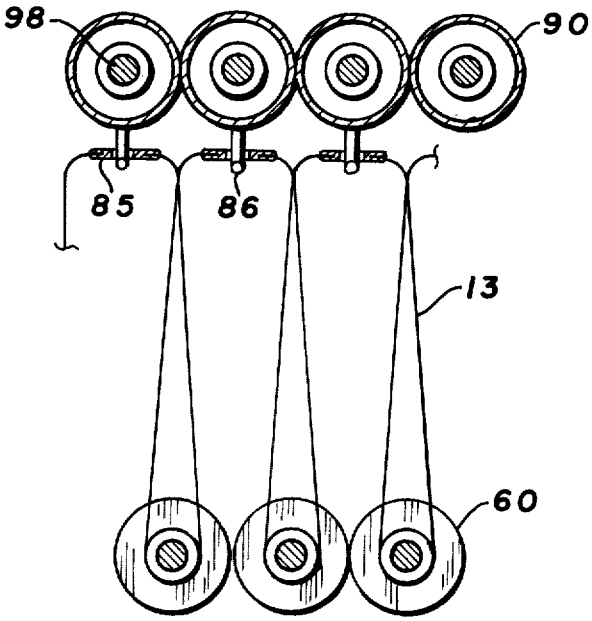

Attention is now directed to FIGS. 17–19 inclusive wherein details of the folding arrangement for the structure are illustrated. Specifically, the views illustrate, progressively, the disposition of the panels, particularly fabric panels, as the structure is being folded from an erect position. The spacing of the individual cross members relative to the panel engaging hooks is such that the fabric is always maintained generally taut, and thus, tangling is avoided. Also, the lanyard device is arranged to be folded so that it also remains taut in folded disposition. The arrangement of utilizing the shelter arrangement inwardly of the frame members enhances the ability of the structure to fold.

Attention is now re-directed to FIGS. 1, 2, 3 and 4 wherein the details of the base panels are illustrated. Specifically, the base panels provide a rigid wall and provide a base which renders the structure semicircular on top of each of the base panel members. As is apparent in the view of FIGS. 1 and 4, the base hub elements 103 and 103A extend outwardly of rigid wall 16 and 17, and are, in turn, anchored by links 104 and 105 to base pivot hubs 106 and 107 respectively. The outer apices of hubs 103 and 103A are coupled by link element or supporting strut 108 and 109 to the base pivot hub 110 and 111 respectively. In order to accommodate closure in the form illustrated in FIG. 2, therefore, relative motion or sliding motion is provided for hubs 110 and 111 so as to achieve and permit collapse of the collapsible frame elements. The utilization of such a rigid wall is not essential, but is normally deemed desirable.

As has been indicated, the above structure may be fabricated from aluminum tubing, with the sleeves, hubs, and other items being made of any suitable durable engineering plastic material such as molded polytetrafluoroethylene, nylon, acetal resin derived by polymerization of formaldehyde (Delrin), or the like. Also, as has been indicated, the fabric used for the shelter may be any suitable fabric such as woven nylon or the like.

In order to provide durability and enhance resistance to stretch, a woven fiber may be laminated with a film to provide enhanced bias strength. The lanyard material may also be any durable woven, braided or knit line fabricated from a material such as nylon or the like. The length of the lanyard device is preferably selected so that it becomes taut when the unit is folded up, this being made possible by the folding arrangement of the structure.

DESCRIPTION OF A SECOND ALTERNATE PREFERRED EMBODIMENT

In accordance with a second alternate preferred embodiment of the present invention, and with particular attention being directed to the embodiment illustrated in FIGS. 20–27 of the drawings, the collapsible shelter means generally designated 120 includes the same basic pair of collapsible frame means, such as has been designated 11 and 12 in the embodiment of FIGS. 1–19 inclusive, with the linkage means forming the lazy-tong structure being, in this case, modified. The repeating segments include solid link elements 121 and 122, links 121 and 122 being coupled together at a pivot point 124. In order to complete the enclosed truss arrangement, outer link elements 126 and 127 are provided, each of which are pivotally coupled at their adjacent ends in bored sleeve arrangements as at 128—128. Pivoting is accomplished through and about pivot pin 129. A support element or post is shown at 130, for slidable retention of the coupling arrangement generally designated 131, all of which will be more fully disclosed in detail hereinafter. A second pivotal support post 132 is provided, where indicated, to complete the repeating segment. One such element 132 is illustrated at the left, with a second corresponding element 132A being shown at the right of FIG. 20. Support posts 132–132A are pivotally mounted in the pivot block assembly generally designated 134, and are held in position by a latching ball-and-socket combination shown generally at 135 in FIG. 21. Member 131 provides a strut brace means which is functionally equivalent to that of the embodiment of FIGS. 1–19, but which is in modified form. Accordingly, the coupling arrangement 131 provides a strut brace pivotal joint for links 126 and 127.

Figure 20:
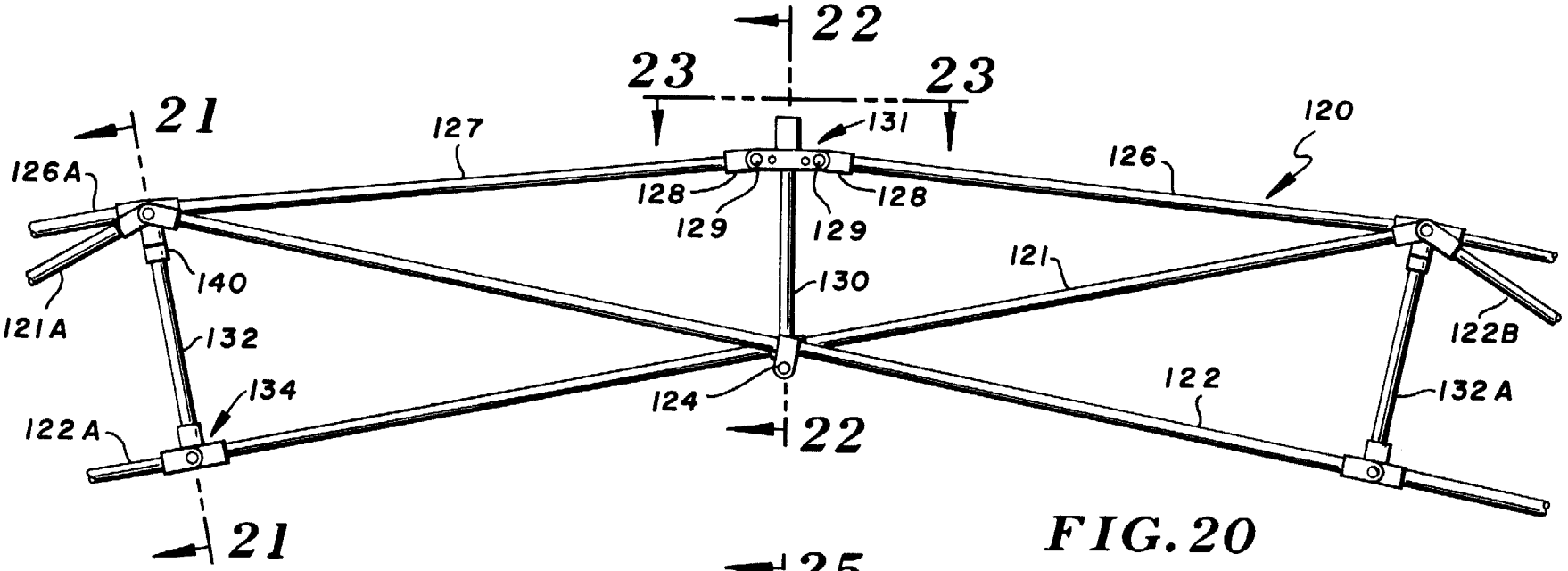
FIG. 20 is a detail elevational view of one repeating segment of the frame means of a slightly modified embodiment of the invention, and illustrating the structure in erect disposition.
Figure 24:
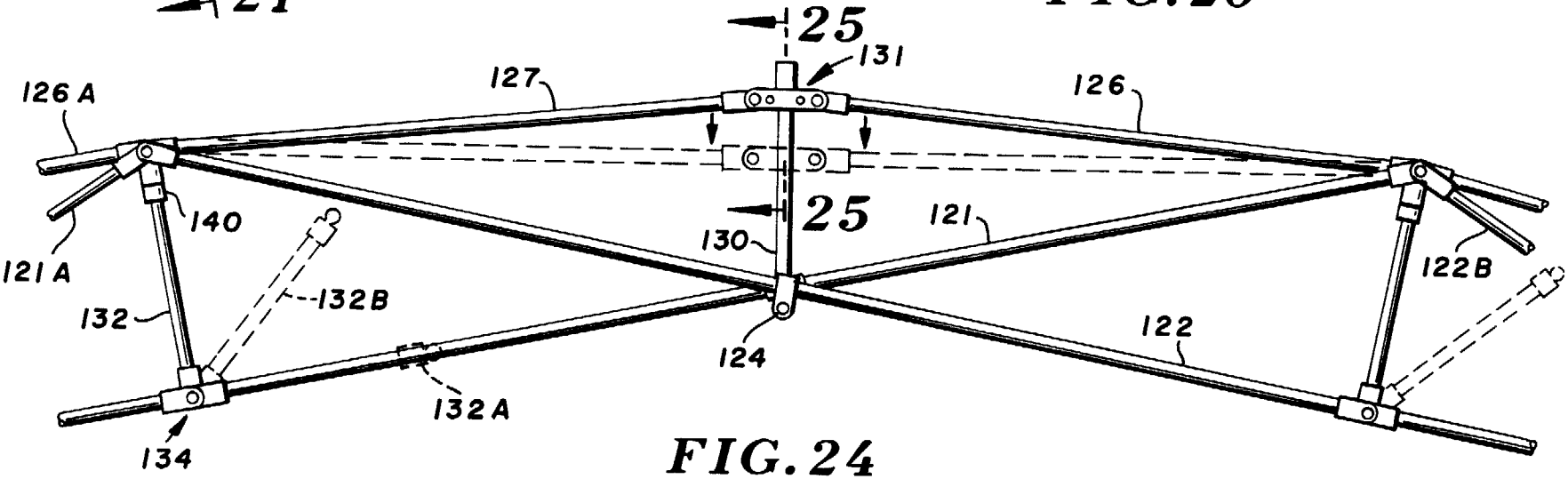
FIG. 24 is a view similar to FIG. 20, and illustrating, in phantom, the disposition of the components of the structure while in partially erected disposition.
Figure 25:
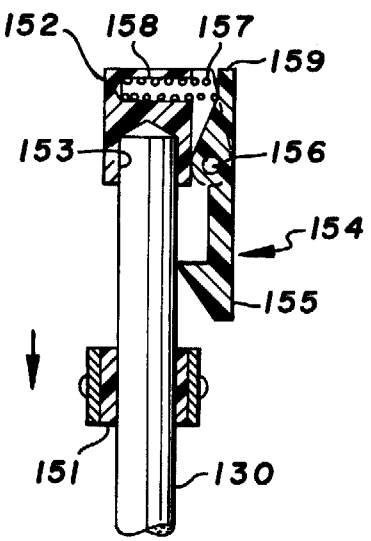
FIG. 25 is a sectional view taken along the line and in the direction of the arrows 25—25 of FIG. 24, and illustrating the disposition of the system in partially erected form, with FIG. 25 illustrating the clamping or latching means for retaining the system in erect disposition.
Figure 21:
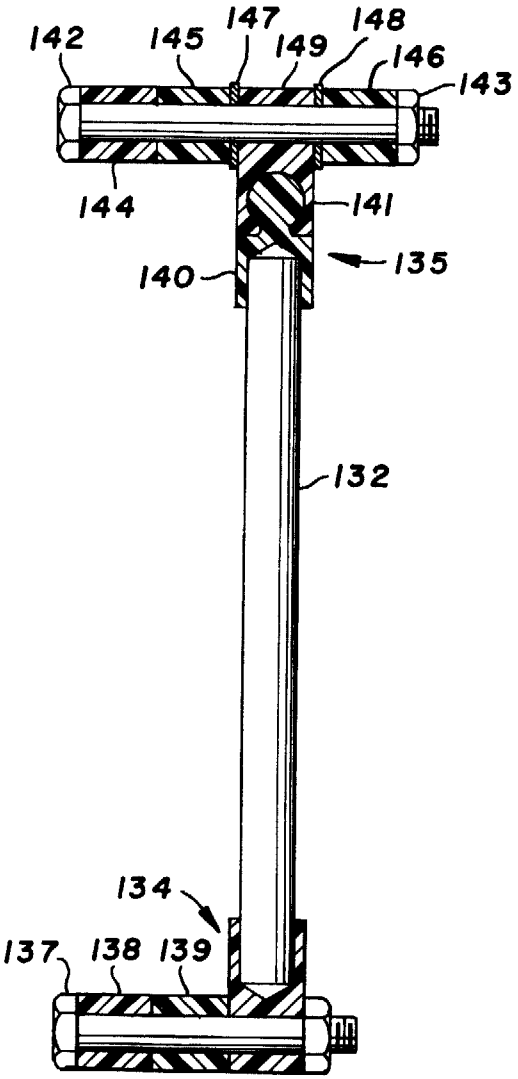
FIG. 21 is a sectional view taken along the line and in the direction of the arrows 21—21 of FIG. 20, with FIG. 21 being shown on a slightly enlarged scale.

Detailed attention is now directed to FIGS. 21 and 24 for a description of the features and details of assemblies 134 and 135. Specifically, assembly 134 utilizes a central stud element 137 as a support pin, with pivoting sleeve elements 138 and 139 being provided for support of rods 121 and 122A, it being noted that rods 121 and 122A are disposed in a straight angular relationship, one to another. Rod 121A corresponds functionally to rod 121 of FIG. 20, while rod 122A corresponds functionally to rod 122 of FIG. 20. The ball-and-socket arrangement 135 includes ball element 140 which is coupled directly to support post 132, with ball receiving socket 141 being provided, ball receiving socket 141 being, in turn, an angular extension of sleeve portion 149, as will be more fully explained hereinafter. Stud element 142 together with nut 143 provide for pivotal retention of rod receiving sleeves 144, 145, and 146 as illustrated, with washers being provided as at 147 and 148 to control and reduce the friction in erecting and collapsing the structure. Rod receiving sleeve element 144 is coupled to one end of rod 122, with rod receiving sleeve element 145 being, in turn, coupled to one end of rod 121A. Sleeve 146 is coupled to one end of link 126A, with the sleeve portion 149 being the socket retaining element, and being in turn coupled to link 127.

Figure 22:
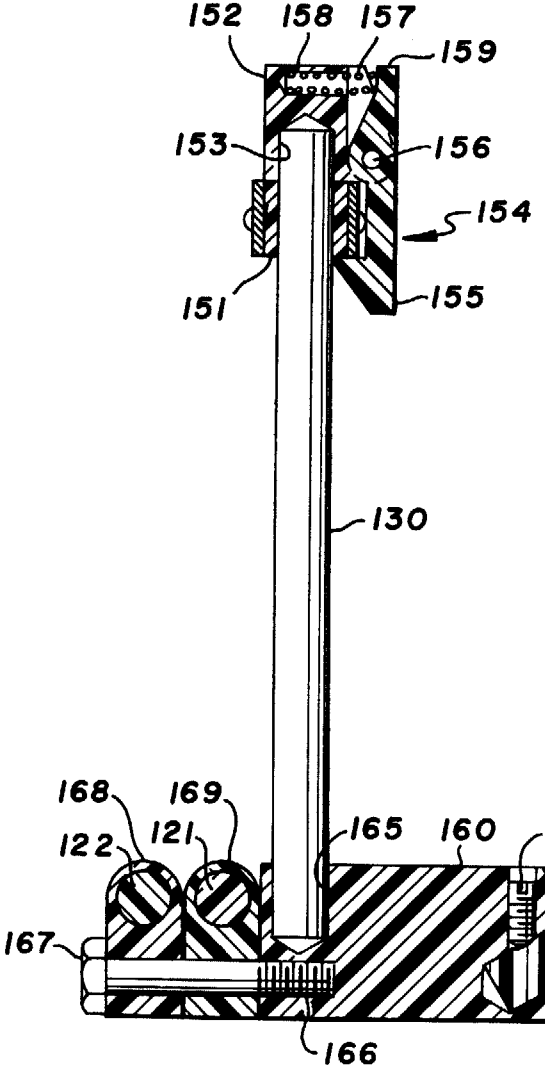
FIG. 22 is a sectional view taken along the line and in the direction of the arrows 22—22 of FIG. 20, with FIG. 22 being shown on a slightly enlarged scale.

Attention is now directed to FIGS. 20 and 22 of the drawings for a detailed description of the pivot and latch assembly shown generally at 131. Pivot and latch assembly includes a nylon sliding sleeve or block 151 which is coupled to a block element 152 having a blind bore 153 formed therein for receiving the end of post 130 therewithin. A pivot-latch assembly is shown generally at 154, with the pivot-latch assembly including a latching dog element 155 which is pivotally secured about pivot 156 to block 152. A compression spring 157 is provided in bore 158 for normally urging latching dog 155 into the position illustrated in FIG. 22. Thumb pressure on latch 155 at point 159 opens the latch and permits the nylon block 151 to slide downwardly upon post 130, such as is illustrated in phantom in FIG. 24. Also as is illustrated in FIG. 22, the base element or block 160 provides a receiving bore 161 for roof boom or panel support 162 which extends between opposed frame members and is utilized to support the fabric of the enclosure with each boom 162 normally being bowed outwardly for added rigidity and water disposal. Set screw 163 is utilized to retain boom 162 in place within the bore 161. Bore 165 is used for receiving post 130, as is indicated. Block 160 is provided with a threaded bore as at 166 for receiving stud 167 therewithin. With reference to FIG. 20, it will be observed that the pivotal joining of rods 121 and 122 occurs within sleeves 168 and 169, with these sleeves being pivotally secured to the shank portion of stud 167.

Figure 7:
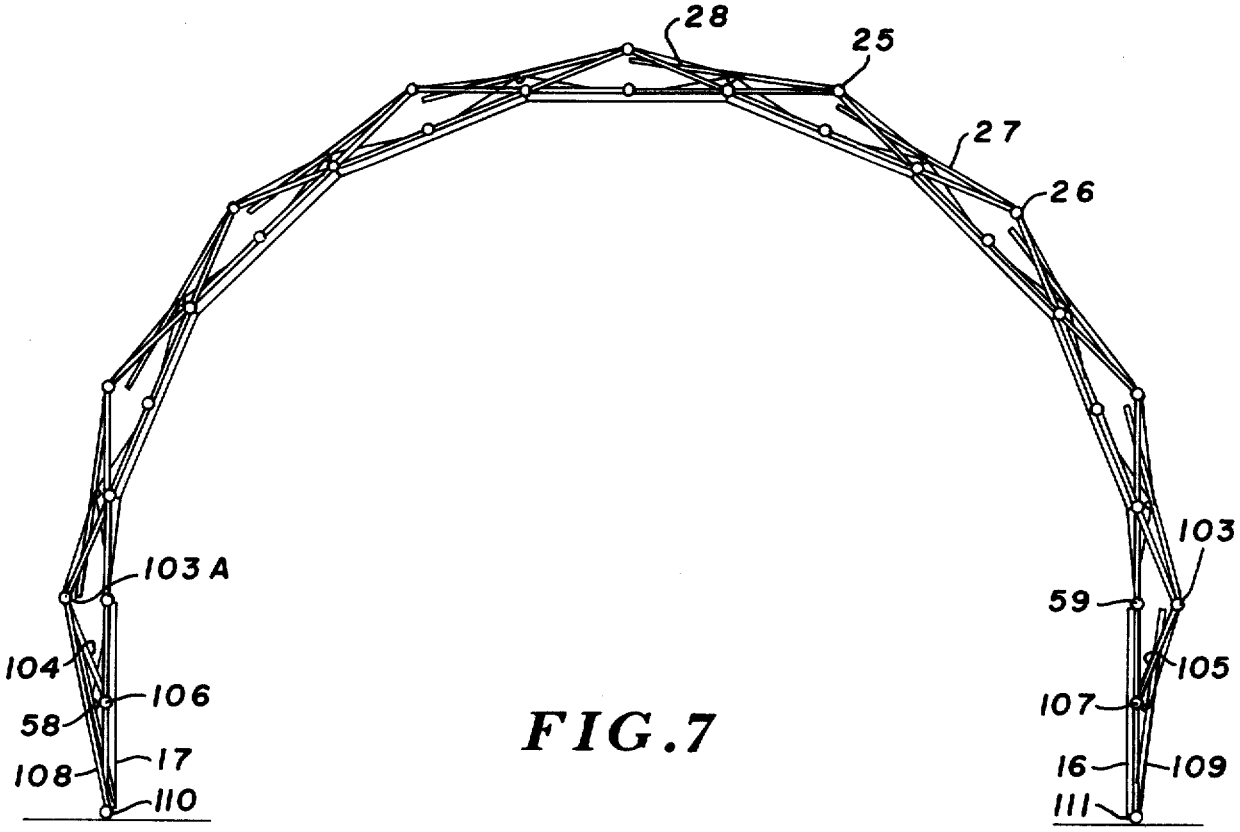
FIG. 7 is a view similar to FIG. 4, and illustrating the disposition of the individual strut members upon initiation of deliberate collapse of the structure.

For erecting the collapsed structure, reference is made initially to FIG. 7 wherein the collapsed repeating segments are shown in detail. Specifically, the individual links are expanded until the disposition is achieved as shown in FIG. 24, with post 132 being shown in the stowed position as at 132A, and in the intermediate disposition at 132B, it being understood that post 132 is the common element to each of these dispositions, the only difference being that of physical disposition. The sliding element of block 151 is moved outwardly from the collapsed disposition to an intermediate disposition as shown in phantom in FIG. 24, and ultimately continued to move in a direction opposite to the arrows shown mediately at FIG. 24 until the fully expanded disposition of the solid lines of FIG. 24 is achieved. The latching element 155 is then engaged about the edge of sleeve or block 151 as illustrated in FIG. 22, and the ball-and-socket joint 135 is secured into place in the form illustrated in FIGS. 20 and 21. To disassemble the system, sequential disengaging of the block 151 from the latching arrangement is followed until the system is fully collapsed. Ordinarily, the first operation for each of the individual segments is the unlatching of the ball-and-socket joint 135.

Figure 26:
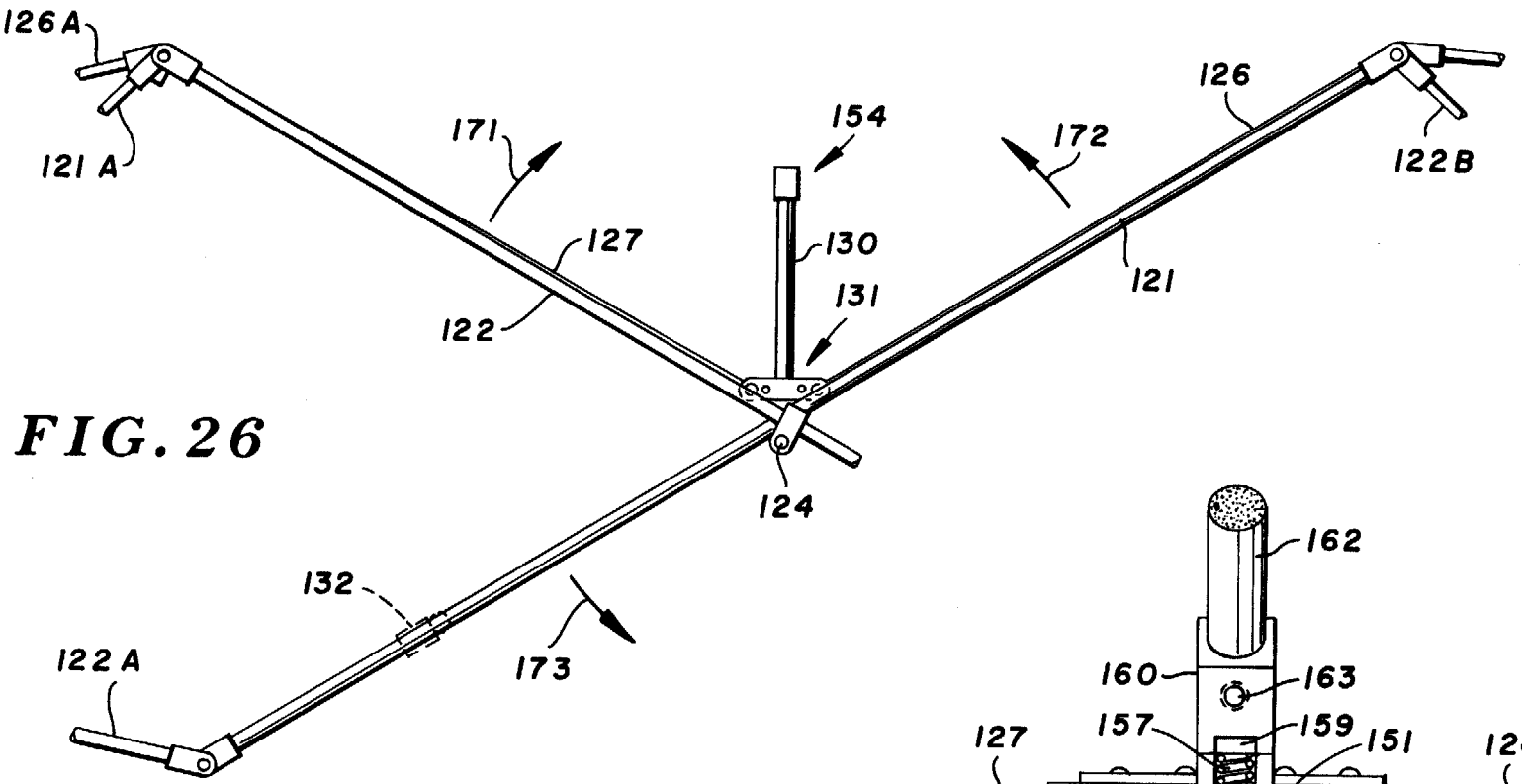
FIG. 26 is a view similar to FIGS. 20 and 24, and illustrating the disposition of the components of the system in partially erected or partially collapsed form.
Figure 23:
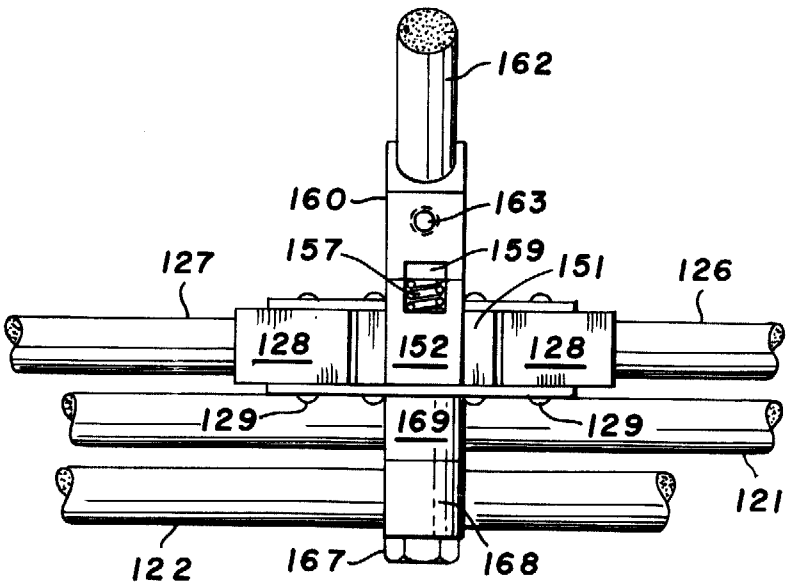
FIG. 23 is a sectional view taken along the line and in the direction of the arrows 23—23 of FIG. 20, with FIG. 23 being shown on a slightly enlarged scale.
Figure 27:
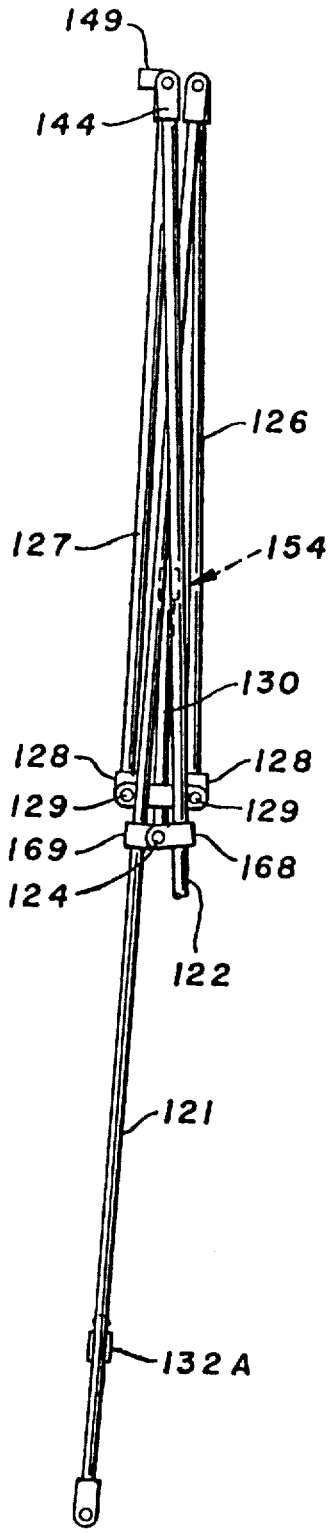
FIG. 27 is an elevational view of one repeating unit of the arrangement in collapsed disposition.

In the embodiment of FIGS. 20–27, it is not necessary to utilize a lanyard or other type of de-coupling arrangement, since each of the individual linkage assemblies are assembled sequentially. Following the collapsing operation which is a continuation of that configuration illustrated in FIG. 26, and following arcuate motion indicated by arrows 171 and 172, the fully collapsed arrangement is ultimately achieved as is illustrated in FIG. 27.

FIG. 26 illustrates the repeating units in partially collapsed configuration, with arrows 171, 172 and 173 illustrating the direction of motion of the individual components during the collapsing operation. As will be appreciated, the linkage assembly includes a solid rod such as rod 121, which mates with rod 122A at pivot point 134. In the adjoining or adjacent linkage assembly, rod 122A will be continuous, and will extend, at its end, to a point corresponding to rod 122B as shown in FIG. 20.

The embodiment illustrated in FIGS. 20–27 is readily adapted for construction utilizing fiberglass rods and molded synthetic resin rod receiving elements. Conventional nylon or acetal resin derived by polymerization of formaldehyde (Delrin) may be utilized for these components.

I claim:

[1. In a collapsible shelter means having a pair of collapsible frame means disposed at opposed ends thereof and supporting panel means extending therebetween, said collapsible frame means comprising:

(a) a lazy-tong structure having first and second interconnected linkage assemblies which in erect disposition form alternate inwardly and outwardly disposed structural spans, said inwardly disposed spans comprising a plurality of angularly coupled rigid members pivotally coupled at mutually adjacent ends to neighboring rigid members to form a generally continuous semipolygon structure which in erect design is enclosed at the top and open at the bottom, each of said inwardly disposed span systems being interconnected at junction points disposed generally midway of the length thereof to longitudinally extending rails for spacing said opposed collapsible frame means one from the other;

(b) said outwardly disposed structural spans comprising a plurality of spanned apart apices; and (c) strut brace means pivotally coupled to alternate apices of said outwardly disposed spans at a strut brace pivotal joint having a strut brace extending from one end thereof and having a strut engaging surface along the opposed side thereof and being adapted to engage the free end of an adjacent strut brace means, the length of said strut brace means being substantially equal to the length of the span between successive junction points and forming an outer compression brace for said strut spans.]

2. The collapsible shelter means as defined in claim [1] *12* being particularly characterized in that spring means normally pivotally urge said strut brace means outwardly.

3. The collapsible shelter means as defined in claim [1] *12* being particularly characterized in that guide means are provided for said strut brace means for controlling the disposition of said strut brace means and retainably supporting said strut brace means adjacent said strut engaging surface.

4. The collapsible shelter means as defined in claim 3 being particularly characterized in that said guide means is slotted to permit relatively longitudinal motion of said strut brace pivotal joint relative to said linkage assemblies.

5. The collapsible shelter means as defined in claim 1 being particularly characterized in that means are provided for pivotally moving each of said strut brace means inwardly as a group.

[6. The collapsible shelter means as defined in claim 1 being particularly characterized in that the panel means extending along the base of said shelter means are fabricated from rigid material.]

7. The collapsible shelter means as defined in claim [1] *12* being particularly characterized in that the inner apices of adjoining interconnected linkage assemblies form a straight angle when in erect disposition.

8. The collapsible shelter means as defined in claim 7 wherein said inner apices lie generally along an arc of substantially uniform radius.

[9. In a collapsible shelter means having a pair of collapsible frame means disposed at opposed ends thereof and supporting panel means extending therebetween, said collapsible frame means comprising:

(a) a lazy-tong structure having first and second interconnected linkage assemblies which in erect disposition form alternate inwardly and outwardly disposed structural spans, said inwardly disposed spans comprising a plurality of angularly coupled rigid members pivotally coupled at mutually adjacent ends to neighboring rigid members to form a generally continuous semipolygon structure which in erect disposition is enclosed at the top and open at the bottom, each of said inwardly disposed span systems being interconnected at spaced junction points to longitudinally extending rails for spacing said opposed collapsible frame means one from the other;

(b) said outwardly disposed structural spans comprising a plurality of spanned apart apices; and (c) strut brace means pivotally coupled to alternate apices of said outwardly disposed spans at a strut brace pivotal joint and having a strut brace extending therefrom, the length of said strut brace means being substantially equal to the length of the span between successive junction points and forming an outer compression brace for said strut spans.]

10. The collapsible shelter means as defined in claim [9] *14* being particularly characterized in that said strut brace pivotal joint has a pair of strut brace links pivotally secured thereto and arranged to extend outwardly therefrom.

11. The collapsible shelter means as defined in claim [9] *14* being particularly characterized in that said strut brace means includes a strut brace pivotal joint slidably received upon a post extending from said spaced junction points of said inwardly disposed span systems.

*12. In a collapsible shelter means having a pair of collapsible means disposed at opposed ends thereof and supporting panel means extending therebetween, said collapsible frame means comprising:*

*(a) a lazy-tong structure having first and second interconnected linkage assemblies which in erect disposition form alternate inwardly and outwardly disposed structural spans, said inwardly disposed spans comprising rigid members pivotally coupled at mutually adjacent ends to neighboring rigid members to form a generally continuous semipolygon structure which in erect design is enclosed at the top and open at the bottom, each of said inwardly disposed span systems being interconnected at junction points disposed generally midway of the length thereof to longitudinally extending rails for spacing said opposed collapsible frame means one from the other;*

*(b) said outwardly disposed structural spans comprising a plurality of spanned apart apices; and*

*(c) strut brace means forming releasable outer compression braces between successive apices of said outwardly disposed spans, each said strut brace means comprising a rigid unitary strut brace having a free end and an end pivotally connected to one of said apices by a strut brace pivotal joint having a strut engaging sur-*

*face for engagement by the free end of an adjacent strut brace, the length of said strut brace means being substantially equal to the length of the span between successive apices.*

*13. In a collapsible shelter means having a pair of collapsible means disposed at opposed ends thereof and supporting panel means extending therebetween, said collapsible frame means comprising:*

*(a) a lazy-tong structure having first and second interconnected linkage assemblies which in erect disposition form alternate inwardly and outwardly disposed structural spans, said inwardly disposed spans comprising rigid members pivotally coupled at a mutually adjacent ends to neighboring rigid members to form a generally continuous semipolygon structure which in erect design is enclosed at the top and open at the bottom, each of said inwardly disposed span systems being interconnected at junction points disposed generally midway of the length thereof to longitudinally extending rails for spacing said opposed collapsible frame means one from the other;*

*(b) said outwardly disposed structural spans comprising a plurality of spanned apart apices; and*

*(c) strut brace means forming releasable outer compression braces between successive apices of said outwardly disposed spans, each said strut brace means comprising a rigid unitary strut brace having a free end and an end pivotally connected to one of said apices by a strut brace pivotal joint having a strut engaging surface for engagement by the free end of an adjacent strut brace, the length of said strut brace means being substantially equal to the length of the span between successive apices, the panel means extending along the base of said shelter means being fabricated from rigid material.*

*14. In a collapsible shelter means having a pair of collapsible means disposed at opposed ends thereof and supporting panel means extending therebetween, said collapsible frame means comprising:*

*(a) a lazy-tong structure having first and second interconnected linkage assemblies which in erect disposition form alternate inwardly and outwardly disposed structural spans, said inwardly disposed spans comprising rigid members pivotally coupled at a mutually adjacent ends to neighboring rigid members to form a generally continuous semipolygon structure which in erect disposition is enclosed at the top and open at the bottom, each of said inwardly disposed span systems being interconnected at spaced junction points to longitudinally extending rails for spacing said opposed collapsible frame means one from the other;*

*(b) said outwardly disposed structural spans comprising a plurality of spanned apart apices; and*

*(c) strut brace means forming releasable outer compression braces between successive apices of said outwardly disposed spans, each said strut brace means comprising a rigid unitary strut brace having a free end and an end pivotally connected to one of said apices by a strut brace pivotal joint having a strut engaging surface for engagement by the free end of an adjacent strut brace, the length of said strut brace means being substantially equal to the length of the span between successive apices.*

*15. In a collapsible structure, in combination:*

*a plurality of rigid rods of equal length;*

*means pivotally connecting said rods medially at sites which are oppositely spaced from the centers thereof by equal amounts;*

*means pivotally interconnecting the ends of rods of said pairs to form a continuous lazy-tong structure having a succession of outward apices and a succession of inward apices, the distances between adjacent inner and outer apices varying with the angle between the rods of said pairs;*

*spacer means for fixing said angles to determine said distances, said spacer means being pivoted at said inward apices for releasably fixing said angles; and*

*strut brace means pivotally connected to said outward apices and having rigid unitary strut braces extending therebetween, the effective lengths of said strut brace means being substantially equal to the distances between successive outward apices so that said strut brace means form outer compression braces for said structure.*

*16. In a collapsible structure, in combination:*

*a plurality of rigid rods of equal length;*

*means pivotally connecting said rods medially at sites which are oppositely spaced from the centers thereof by equal amounts;*

*means pivotally interconnecting the ends of rods of said pairs to form a continuous lazy-tong structure having a succession of outward apices and a succession of inward apices, the distances between adjacent inner and outer apices varying with the angle between the rods of said pairs;*

*spacer means for fixing said angles to determine said distances, said spacer means being pivoted at said inward apices for releasably fixing said angles;*

*strut brace means including medial hinges and being pivotally connected to said outward apices and having rigid unitary strut braces extending therebetween, the effective lengths of said strut brace means being substantially equal to the distances between successive outward apices so that said strut brace means form outer compression braces for said structure; and*

*means extending outwardly at the medial pivotal connections between said rods, and means releasably fixing the position of said medial hinges outwardly of said medial pivotal connections.*

* * * * *

UNITED STATES PATENT AND TRADEMARK OFFICE

CERTIFICATE OF CORRECTION

PATENT NO. : Re. 31,565

DATED : April 24, 1984

INVENTOR(S) : Bryan J. Beaulieu

It is certified that error appears in the above-identified patent and that said Letters Patent are hereby corrected as shown below:

Column 11, line 59, "Claim 1" should read -- Claim 12 --.

Signed and Sealed this

Ninth Day of October 1984

[SEAL]

*Attest:*

*Attesting Officer*

GERALD J. MOSSINGHOFF

*Commissioner of Patents and Trademarks*